Aug. 16, 1927.

F. M. CASE 1,639,629

CLICK MECHANISM FOR FISHING REELS

Original Filed July 26, 1923

Inventor
Francis M. Case
By Brockett, Hyde & Milburn
Attorneys

Patented Aug. 16, 1927.

1,639,629

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

CLICK MECHANISM FOR FISHING REELS.

Original application filed July 26, 1923, Serial No. 653,916. Divided and this application filed June 26, 1925. Serial No. 39,725.

This invention relates to improvements in fishing reels, the present application being a division of my co-pending application for fishing reels, filed July 26, 1923, now Patent No. 1,547,297, granted July 28, 1925.

The object of the present invention is to improve the click mechanism by the provision of improved spring means for the click pawl, which means is of simple and inexpensive construction, effective in use and capable of ready assembly with the reel parts.

Further objects of the invention are in part obvious and in part will appear more in detail hereinafter.

Figure 1:
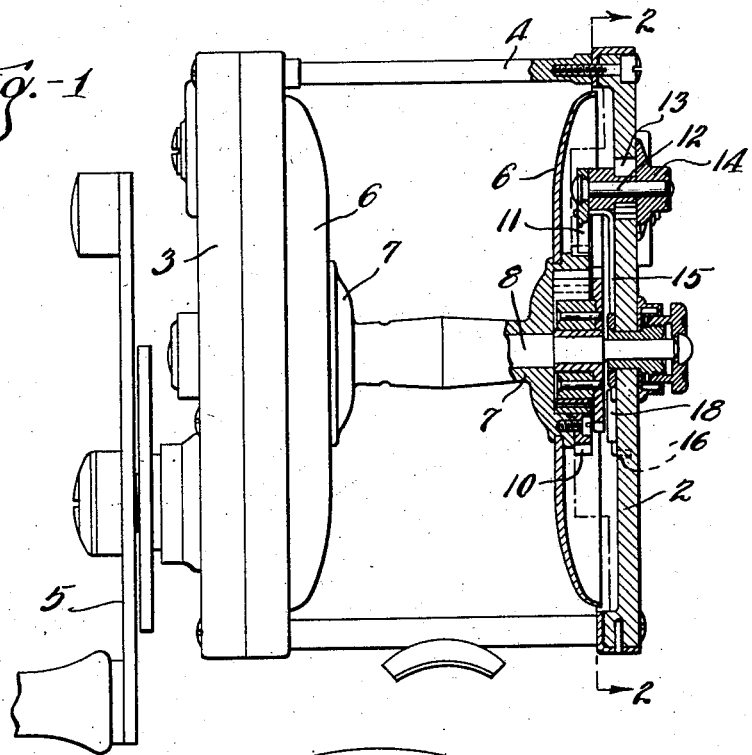
Figure 2:
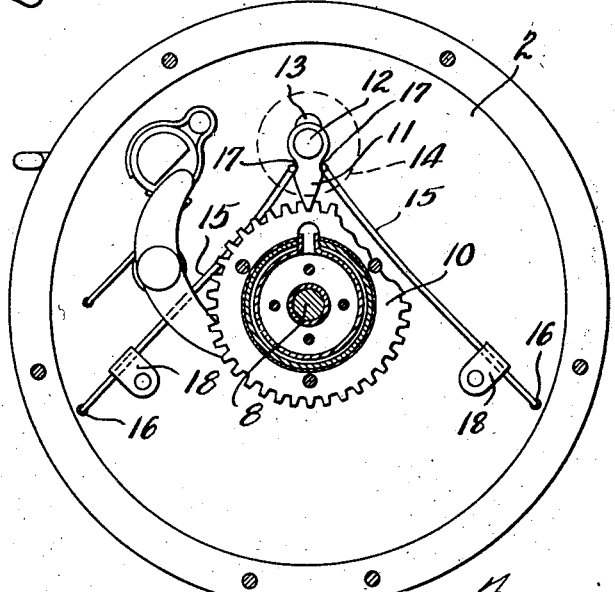

In the drawing, Fig. 1 is a side elevation of a fishing reel embodying the invention, part thereof being broken away and in section; and Fig. 2 is a cross sectional view on the line 2—2, Fig. 1.

The fishing reel shown in the drawing includes the usual frame having a foot plate adapted for attachment to the fishing rod and end caps or heads 2, 3 connected by the usual pillars or posts 4. Rotatably mounted in this frame is a line receiving spool which is adapted to be driven by the operating handle 5. Said spool comprises two concave end heads 6 suitably mounted upon the ends of a hub member 7, the latter being sleeved upon and rotatable with the spool shaft or spindle 8, which is journalled in suitable bearing in the end heads or caps 2, 3.

The click mechanism forming the subject matter of the present application is preferably located at that end of the spool opposite to its driving end. As illustrated, said mechanism includes a ratchet or click pinion 10 suitably mounted upon one end portion of the spool shaft or spindle 8 and adapted to rotate therewith. Co-operating with the teeth of said pinion is a yielding pawl 11 of the arrow head type, said pawl being pivotally mounted upon a stud 12 passing though a slot 13 in the end plate 2 and capable of radial adjustment along said slot by manipulation of the operating button 14 suitably mounted upon the stud 12.

The click pawl is subject to the effect of two opposing springs, each of which consists of a substantially straight wire 15 having its ends bent radially in opposite directions. One bent end of each spring is secured within an opening 16 in the end head 2 while its other bent end normally engages or seats within a recess 17 in the side of the pawl, as clearly shown in Fig. 2. Each of said springs is suitably held in place by an L-shaped clip 18 secured to the end head 2.

When the pawl is pushed outwardly it is, of course, inoperative and no clicking effect is produced, but when it is pushed inwardly, as shown in the drawing, the ends of the springs 15 engage in the pawl recesses 17 and maintain the pawl in engagement with the teeth of the click pinion. Rotation of the spool in either direction produces a clicking noise and the pawl serves also to retard spool rotation equally in opposite directions.

What I claim is:

In a fishing reel, a frame including a support, a spool rotatable in said frame, a click pinion rotatable with said spool, and an adjustable click pawl for co-operation with said pinion, spring means for maintaining said pawl in the desired position and comprising a pair of spring wires each having its end portions bent laterally in opposite directions, said support being provided with spaced openings to receive one end portion of each wire, the other end portions of said wires being in engagement with said pawl, and clips mounted on said support for securing said wires thereto.

In testimony whereof I hereby affix my singnature.

FRANCIS M. CASE.